United States Patent
N et al.

(10) Patent No.: US 11,947,969 B1
(45) Date of Patent: Apr. 2, 2024

(54) DYNAMIC DETERMINATION OF A LEADER NODE DURING INSTALLATION OF A MULTIPLE NODE ENVIRONMENT

(71) Applicant: Dell Products, L.P., Hopkinton, MA (US)

(72) Inventors: Pavan N, Bangaluru (IN); Shantanu Joshi, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 27 days.

(21) Appl. No.: 17/989,734

(22) Filed: Nov. 18, 2022

(51) Int. Cl.
*G06F 9/44* (2018.01)
*G06F 9/4401* (2018.01)

(52) U.S. Cl.
CPC .................. *G06F 9/4401* (2013.01)

(58) Field of Classification Search
CPC .................................................. G06F 9/4401
See application file for complete search history.

(56) References Cited

U.S. PATENT DOCUMENTS

| | | | |
|---|---|---|---|
| 6,178,445 B1* | 1/2001 | Dawkins | G06F 15/177 714/13 |
| 2008/0281938 A1* | 11/2008 | Rai | G06F 15/177 709/209 |
| 2014/0173251 A1* | 6/2014 | Lee | G06F 9/3879 712/30 |

* cited by examiner

*Primary Examiner* — Stefan Stoynov
(74) *Attorney, Agent, or Firm* — Anderson Gorecki LLP (57) ABSTRACT

Dynamic determination of a leader node during installation of a multiple node environment is implemented using a shared device and a messaging framework. The leader node is responsible for managing installation of all shared resources. When installation of a multiple node environment is initiated, each node runs a local boot script that governs its local boot process. Each node posts status updates of its boot operations to the messaging framework. Each node also dynamically determines whether it is the leader node by checking the messaging framework to learn whether installation of any of the shared resources has been started. If installation of the shared resources has not started, the node attempts to obtain a lock on the shared device. The node that obtains the lock on the shared device is the leader node. The leader node posts status updates related to installation of the shared resources to the messaging framework.

20 Claims, 3 Drawing Sheets

DYNAMIC DETERMINATION OF A LEADER NODE DURING INSTALLATION OF A MULTIPLE NODE ENVIRONMENT

FIELD

This disclosure relates to computing systems and related devices and methods, and, more particularly, to a method and apparatus for dynamic determination of a leader node during installation of a multiple node environment.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In a multiple node environment, multiple nodes such as physical or virtual servers, share resources such as filesystems, databases, or other resources. For example, a storage system might have multiple storage engines, and each storage engine might have two separate compute nodes. When the storage system is first turned on, each of the compute nodes will implement a boot process. The timing of the boot process of each compute node is unpredictable, and two or more compute nodes can boot simultaneously or one or more of the compute nodes might encounter a delay during the boot process that causes the compute node to take significantly longer to complete the boot process.

In addition to implementing local boot processes by each compute node, the storage system also includes shared resources that need to be configured when the storage system is first turned on. In a situation where multiple nodes are simultaneously implementing a boot process, it is possible for multiple compute nodes to simultaneously attempt to access the shared resources of the storage system to install the shared resources in the multiple node environment. This can lead to a race condition where multiple nodes attempt to implement the same initialization operations on the shared resources.

According to some embodiments, dynamic determination of a leader node during installation of a multiple node environment is implemented using a shared device, that is accessible to all compute nodes, and a messaging framework. When installation of a multiple node environment is initiated, each compute node runs a local boot script that governs the boot process on the compute node. As part of the local boot script, each compute node posts status updates of its local boot operations to the messaging framework. In some embodiments, the local boot script on each compute node is configured to enable the compute node to dynamically determine whether it is the leader node or if it is a follower node. In some embodiments, only one node in the set of nodes of the multiple node environment is dynamically determined to be the leader node, and all other nodes of the set of nodes of the multiple node environment are dynamically determined to be follower nodes. If the compute node dynamically determines that it is the leader node, the compute node also runs a global boot script to initiate all of the shared resources in the multiple node environment. If the compute node determines that it is a follower node, it does not attempt to initiate any of the shared resources in the multiple node environment.

In some embodiments, as part of the local boot script, each compute node checks the messaging framework to determine whether any of the installation tasks associated with the shared resources has started. When a compute node determines from the messaging framework that one or more of the installation tasks associated with the shared resources has started, the compute node interprets this status as an indication that another compute node has been dynamically determined to be the leader node, and the compute node determines that it is a follower node. Accordingly, the follower node is not responsible for managing the installation tasks associated with the shared resources of the multiple node environment.

When a compute node determines from the messaging framework that none of the installation tasks associated with the shared resources has started, the compute node attempts to obtain a lock on the shared device. When the compute node is not able to obtain a lock on the shared device, either because another compute node has already obtained the lock or the attempt otherwise fails, the compute node interprets this status as an indication that another compute node has dynamically determined to be the leader node and, accordingly, determines that it is a follower node. Accordingly, the follower node is not responsible for managing the installation tasks associated with the shared resources in the multiple node environment.

When the compute node obtains the lock on the shared device, it is dynamically determined to be the leader node for the boot process of the multiple node environment, and is responsible for managing the installation tasks associated with the shared resources of the multiple node environment. Accordingly, the compute node runs a global boot script in addition to its local boot script to manage the installation tasks associated with the shared resources. The leader node updates the status of each shared resource installation task on the messaging framework to provide the follower nodes with updates as to the status of the installation tasks associated with shared resources in the multiple node environment. When the leader node has completed all of the shared resource installation tasks, it releases the lock on the shared device.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
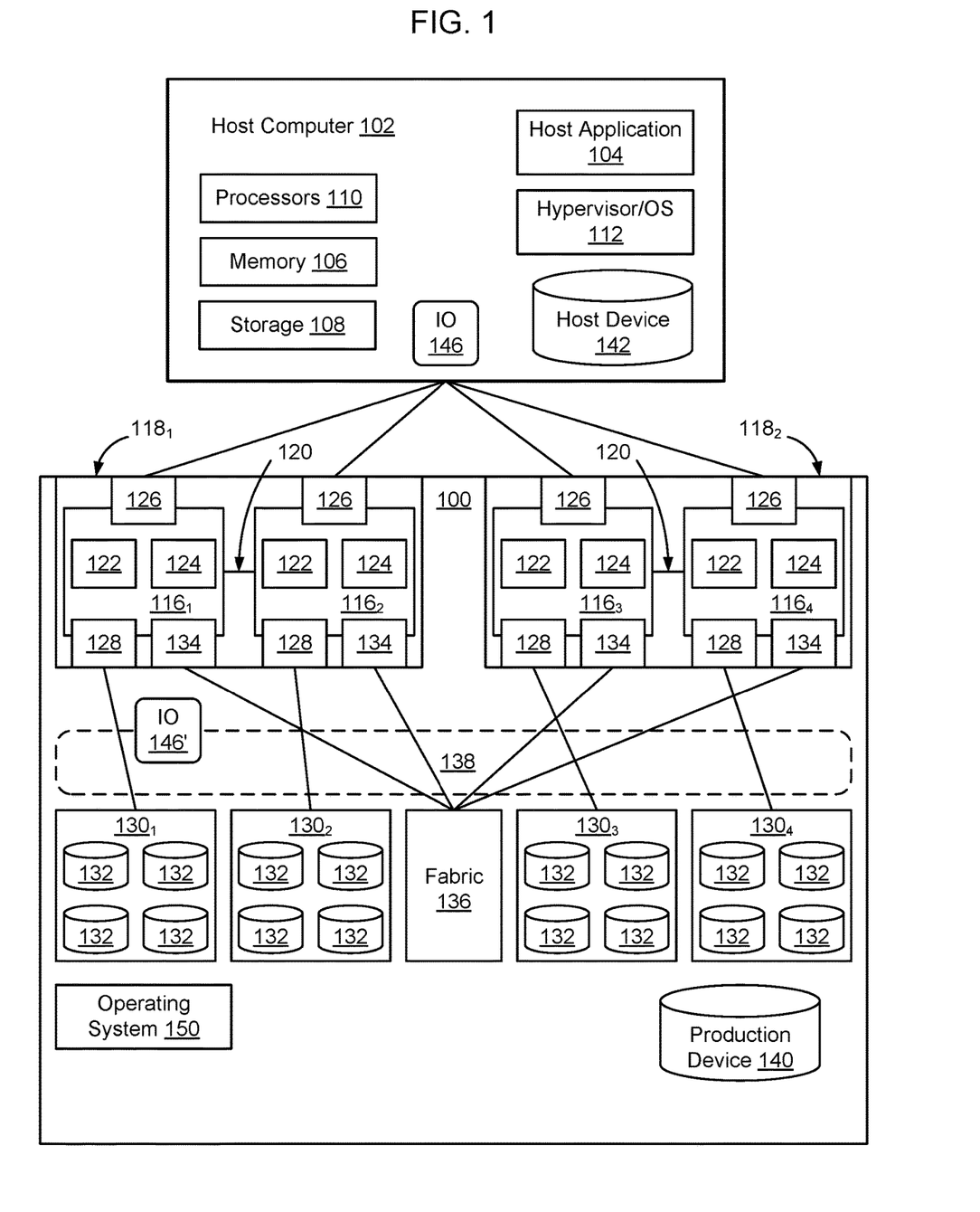
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Storage system 100 is one example of a multiple node environment. Specifically, as shown in FIG. 1, in some embodiments the storage system 100 has one or more storage engines 118, each of which has two compute nodes 116. Depending on the implementation, a given storage engine may have up to eight storage engines and, accordingly, up to sixteen compute nodes 116. Other embodiments may include other numbers of storage engines 118 and, likewise, a given storage engine 118 may include more than two compute nodes 116. When the storage system 100 is first turned on, for example when power is provided to the storage system 100 after the storage system has been powered off, in some embodiments each compute node 116 is implemented as a self-contained computer that is configured to independently execute a boot process governed by local boot script 200 to prepare itself to operate in the multiple node environment.

In a multiple node environment such as storage system 100, multiple nodes such as physical or virtual servers or compute nodes 116 may be configured to access shared resources 230. Example shared resources might include filesystems, databases, or numerous other types of shared resources 230. When the storage system 100 is turned on for the first time, or is shut down and then turned back on, each of the compute nodes 116 will implement a local boot process, for example governed by a local boot script 200. The local boot script 200 might require particular shared resources 230 to be initiated to continue implementation of the local boot script 200. Accordingly, when the multiple node environment is started, it is important to configure the shared global resources 230. However, the timing of the boot process of each compute node 116 is unpredictable, such that two or more compute nodes 116 may boot simultaneously or one or more of the compute nodes 116 might encounter a delay during the boot process that causes the compute node 116 to take significantly longer to complete the boot process.

According to some embodiments, the compute nodes 116 of a multiple node environment are configured to dynamically determine a leader node $116_L$ during installation of the multiple node environment. An example multiple node environment will be described in connection with a storage system 100 that includes multiple compute nodes 116. It should be understood that the dynamic process of determining a leader node during installation of a multiple node environment may be implemented in other contexts as well where multiple compute nodes require installation of shared resources to prepare the shared resources to be used by the compute nodes in the multiple node environment.

According to some embodiments, dynamic determination of a leader node $116_L$ during installation of a multiple node environment is implemented using a shared device 210, that is accessible to all compute nodes 116, and a messaging framework 220. When installation of a multiple node environment is initiated, each compute node 116 runs a local boot script 200 that governs the boot process on the compute node 116. In some embodiments, the local boot script 200 on each compute node causes the compute node 116 to post status updates of its local boot operations to the messaging framework 220.

In some embodiments, the local boot script on each compute node is configured to cause the compute node to dynamically determine whether it is the leader node $116_L$ or if it is a follower node $116_F$. In some embodiments, only one node in the set of nodes of the multiple node environment is dynamically determined to be the leader node $116_L$, and all other nodes of the set of nodes of the multiple node environment are dynamically determined to be follower nodes $116_F$. If the compute node 116 determines that it is the leader node $116_L$, the leader node $116_L$ also runs a global boot script 205 to initiate all of the shared resources 230 in the multiple node environment. If the compute node 116 determines that it is a follower node $116_F$, it does not attempt to initiate any of the shared resources 230 in the multiple node environment. In some embodiments, the dynamic determination of the leader node $116_L$ is independently determined by each of the nodes of the multiple node environment in such a manner that it is only possible for one of the compute nodes 116 to be dynamically determined to be the leader node $116_L$ and all other nodes are dynamically determined to be follower nodes $116_F$.

Figure 2:
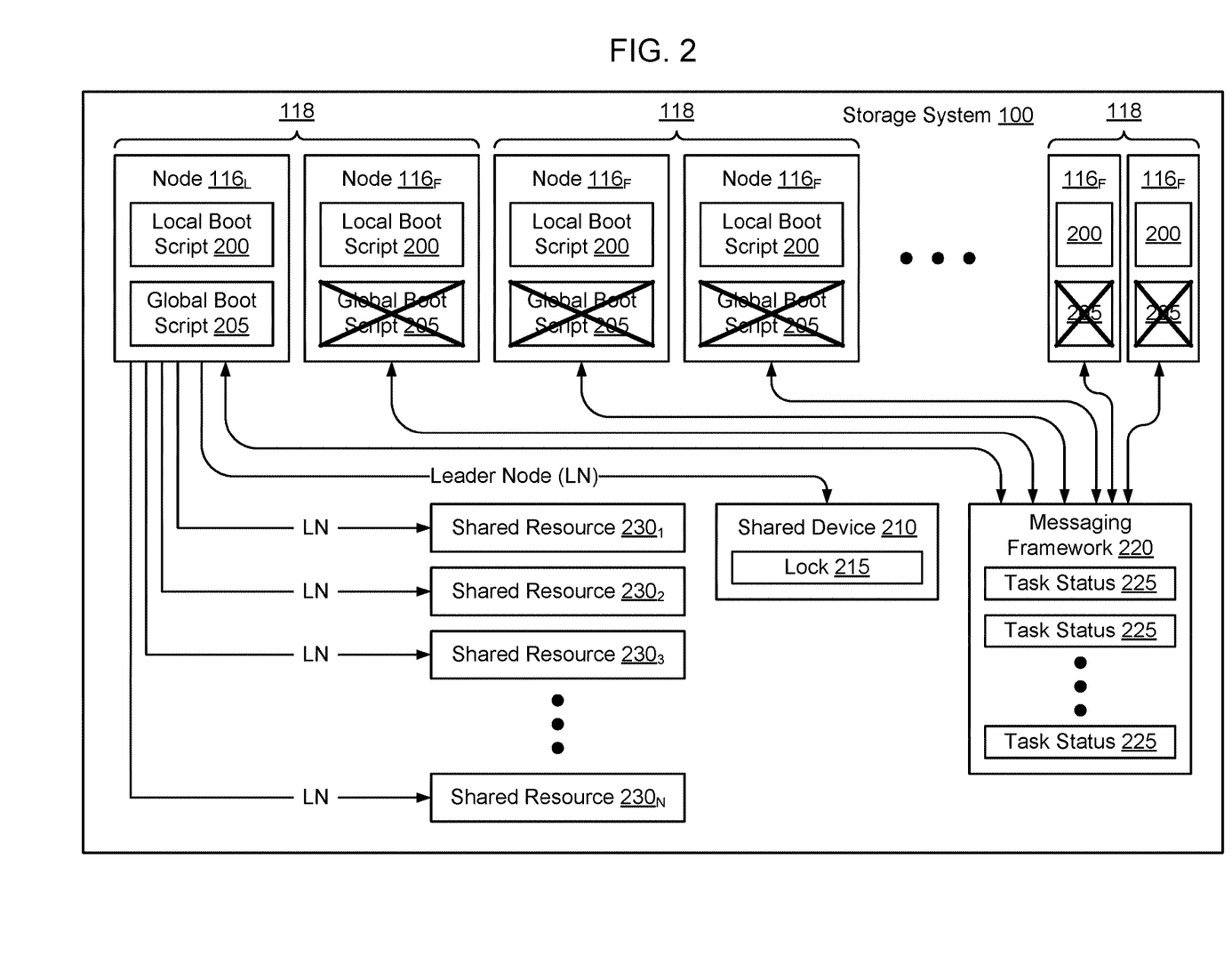
FIG. 2 is a functional block diagram of a storage system implementing an example multiple node environment that includes multiple compute nodes and a set of shared resources, according to some embodiments.

FIG. 2 is a functional block diagram of a multiple node environment, according to some embodiments. As shown in FIG. 2, in some embodiments, a storage system 100 includes a plurality of storage engines 118, and each storage engine 118 includes a pair of two separate compute nodes 116. Each compute node 116 is a separate computational node that independently implements a boot process within storage engine 118 when storage engine 118 is started. Upon startup of a given compute node 116, the compute node runs a local boot script 200 that controls execution of the boot (startup) process of the compute node 116. The particular boot script 200 implemented on a given compute node 116 will depend on the particular implementation. An example boot process might include actions such as loading the boot code from a hard drive, using the boot code to start the operating system on the compute node 116, having the operating system load device drivers and start services, and then complete loading of the operating system. Additional boot operations, such as BIOS load, power-on-self-test (POST), system configuration steps, system utility load operations, etc., may be specified by the local boot script 200, depending on the particular implementation. Numerous additional or different sequences may be envisioned depending on the particular boot scripts 200 used to control the local boot processes of each of the compute nodes 116.

When the storage system 100 is first started, for example when the storage system is first deployed or when the storage system 100 is turned on after being shut down, each compute node 116 of the multiple node environment will individually execute a boot process using its local boot script 200. As noted above, the different nodes 116 might boot at different rates. Additionally, depending on the configuration of the boot script 200, the boot script might specify that the compute node should take a particular set of actions, and then wait for a particular shared resource to be initiated before continuing the local boot operations.

As shown in FIG. 2, in some multiple node environments, the multiple node environment includes shared resources $230_1$-$230_N$ that need to be configured during the boot process for use by all of the compute nodes 116. According to some embodiments, a dynamic process of determining a leader node $116_L$ during installation of a multiple node environment is implemented locally, for example in connection with execution of a local boot script 200 as the nodes boot in the multiple node environment. In some embodiments, the dynamic process of determining the leader node $116_L$ is implemented using a shared device 210 and a messaging framework 220. The shared device 210 is accessible to each of the compute nodes 116 and includes a lock 215. The compute node 116 that obtains the lock 215 on the shared device 210 is the leader node $116_L$, and implements a global boot script 205 in addition to its local boot script 200. The global boot script 205 might be stored on each of the compute nodes 116 as shown in FIG. 2, or might be accessed by the leader node $116_L$ once the leader node has been dynamically selected. For example, in some embodiments, the global boot script 205 might be loaded by the leader node $116_L$ from the shared device 210.

The messaging framework 220 is used by the compute nodes 116 to post boot status updates. Each compute node 116 posts task status updates 225 as the compute node implements its local boot process as specified in the local boot script 200. The leader node $116_L$ also posts task status updates 225 about the installation of shared resources $230_1$-$230_N$.

When installation of a multiple node environment is initiated, each compute node 116 runs a local boot script 200 that governs the boot process on the compute node 116. As part of running the local boot script, each compute node 116 posts status updates of its local boot operations to the messaging framework 220. In some embodiments, the messaging framework 220 is implemented using a network-based messaging protocol such as Service Location Protocol (SLP) that enables each of the compute nodes 116 to post messages to all other compute nodes 116. In some embodiments, the messaging framework 220 is implemented using a shared database that enables each of the compute nodes 116 to provide updates to the database that are then able to be retrieved by each of the other compute nodes 116.

Each compute node 116 also dynamically determines whether it is the leader node $116_L$ or if it is a follower node $116_F$. If the compute node 116 determines that it is the leader node $116_L$, the leader node $116_L$ also runs a global boot script 205 to initiate all of the shared resources 230 in the multiple node environment. If the compute node 116 determines that it is a follower node $116_F$, it does not attempt to initiate any of the shared resources 230 in the multiple node environment.

Figure 3:
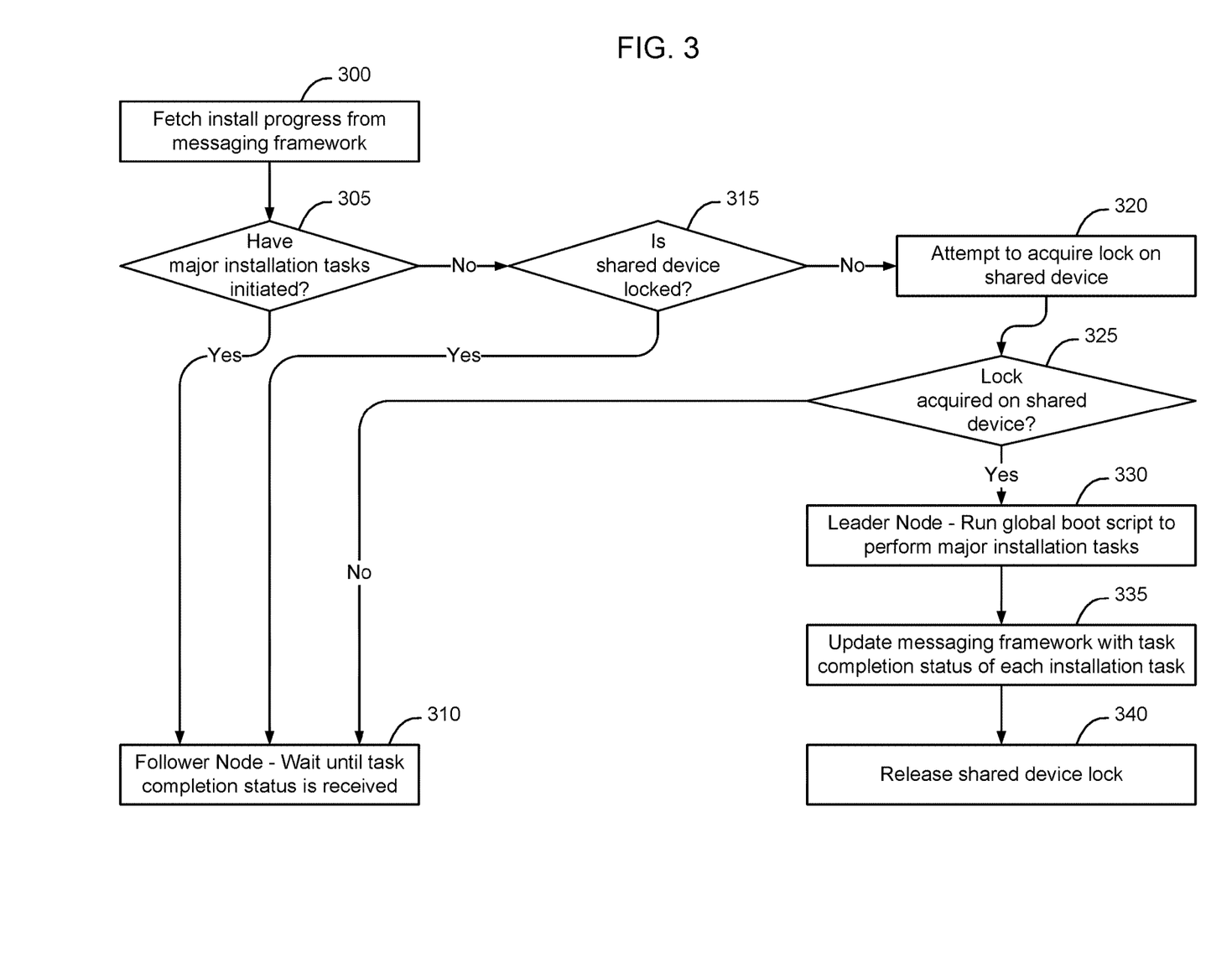
FIG. 3 is a flow chart of an example process of dynamic determination of a leader node during installation of a multiple node environment, according to some embodiments.

FIG. 3 is a flow chart of an example process implemented by each compute node 116 of a multiple node environment, to dynamically determine a leader node $116_L$ during installation of a multiple node environment, according to some embodiments. In some embodiments, the local boot script 200 on each compute node 116 contains instructions to cause each respective compute node to independently implement the process shown in FIG. 3 to enable one of the nodes of the multiple node environment to be deterministically selected as the leader node $116_L$ and all of the other nodes of the multiple node environment to be deterministically selected as follower node $116_F$.

As shown in FIG. 3, during installation of a multiple node environment, each compute node 116 queries the messaging framework 220 to determine the current installation status of the multiple node environment (block 300). A determination is then made as to whether any of the major installation tasks of shared resources 230 have been initiated (block 305). For example, in some embodiments each compute node 116 queries the messaging framework 220, as part of its local boot script 200, to determine if any task status entries 225 have been entered into the messaging framework 220 that are associated with any of the shared resources 230.

When a compute node determines that the messaging framework includes one or more task status entries 225 associated with installation tasks associated with one or more of the shared resources 230 (a determination of YES at block 305), another compute node has assumed the role of leader node $116_L$, and the compute node 116 determines that it is a follower node $116_F$ (block 310). Accordingly, the follower node $116_F$ is not responsible for managing the installation tasks associated with the shared resources 230, and the follower node $116_F$ will wait until the tasks associated with installation of shared resources 230 has completed (block 310). For example, as shown in FIG. 2, one node has assumed the role of leader node $116_L$, and all other nodes have assumed the role of follower node $116_F$. The leader node executes global boot script 205, whereas the follower nodes $116_F$ do not execute global boot script 205.

In some embodiments, the global boot script 205 includes an order in which the shared global resources 230 are to be initialized, and the step of querying the messaging framework 220 for status updates associated with initialization of shared resources 230 may be implemented by causing each compute node 116 to query for any task status updates 225 associated with the first shared global resource 230 that will be started once a compute node 116 assumes role of the leader node $116_L$.

When a compute node determines from the messaging framework that none of the installation tasks associated with the shared resources 230 has started, or that installation tasks associated with the first shared resource 230 has not started (a determination of NO at block 305), the compute node 116 queries the shared device 210 to determine if the shared device 210 is locked (block 315). If the shared device 210 is locked (a determination of YES at block 315), another compute node 116 has obtained the lock 215 on the shared device 210 and, hence, that other compute node 116 has assumed the role of leader node $116_L$. The compute node 116 therefore determines that it is a follower node $116_F$ (block 310). Accordingly, the follower node $116_F$ is not responsible for managing the installation tasks associated with the shared resources 230, and the compute node 116 will wait until the tasks associated with installation of shared resources 230 has completed (block 310).

If the shared device 210 is not locked (a determination of NO at block 315), the compute node 116 will attempt to acquire the lock 215 on the shared device 210 (block 320). The compute node 116 then determines whether it has successfully acquired the lock 215 on the shared device 210 (block 325). If the compute node 116 was not able to acquire the lock 215 on the shared device 210 (a determination of NO at block 325), the compute node 116 is not the leader node $116_L$ and is a follower node $116_F$. Accordingly, the follower node $116_F$ is not responsible for managing the installation tasks associated with the shared resources 230, and the compute node 116 will wait until the tasks associated with installation of shared resources 230 has completed (block 310).

If the compute node 116 acquires the lock 215 on the shared device 210 (a determination of YES at block 325), the compute node 116 is the leader node $116_L$ (block 330). In response to a determination by a compute node 116 that the compute node is the leader node $116_L$, the compute node acquires access to a global boot script 205 and runs the global boot script 205 to perform all the major installation tasks of the shared resources 230 (block 330). In some embodiments the global boot script 205 is locally stored on each compute node 116. In some embodiments, the global boot script 205 is implemented as part of the local boot script. In some embodiments, the global boot script 205 is accessed by the leader node from an accessible resource, such as an accessible memory or the shared device 210. Each time a notification event occurs that is associated with one of the major installation tasks, the leader node $116_L$ posts a task status update 225 to the messaging framework 220 (block 335). Example notification events might include shared device lock 215 acquired, shared resource ID—task started, shared resource ID—task progress, shared resource ID—task completed, or other events as specified in the global boot script 205.

When the compute node 116 obtains the lock on the shared device 210, it is the leader node $116_L$ and is responsible for managing the installation tasks associated with the shared resources 230. Accordingly, the compute node 116 runs a global boot script 205 in addition to its local boot script 200 to manage the installation tasks associated with the shared resources 230. The leader node $116_L$ updates the status of each installation task on the messaging framework 220 to provide the follower nodes $116_F$ with updates as to the status of the installation tasks associated with shared resources 230 in the multiple node environment. When the leader node $116_L$ has completed all of the installation tasks associated with shred resources 230, it releases the lock 215 on the shared device 210. Providing updates related to installation of shared resources 230 on the messaging framework 220 enables follower nodes $116_F$ to be notified when particular shared resources 230 become available, which enables the compute nodes 116 to continue local boot script processes that require the global resources to be configured before the local boot script is able to complete the boot processes.

In some embodiments, the shared device 210 is any device (formatted or raw) that is accessible to all of the compute nodes 116. In some embodiments the shared device is used only in connection with lock 215, such that the first node to obtain the lock 215 on the shared device 210 is determined to be the leader node $116_L$ for the duration of the installation process of the multiple node environment. In embodiments where the device 210 is not otherwise used during the boot process, the particular type of device will depend on the implementation. Example devices might include a logical storage volume, a physical component such as a particular register, or another logical or virtual component that is capable of being associated with a lock 215.

The messaging framework enables the compute nodes 116 to communicate boot status information with each other during the installation process of the multiple node environment. Each compute node 116 retrieves task status messages 225 from the messaging framework 220 to determine if installation tasks associated with shared resources 230 have been started. If the installation tasks have been started, another compute node 116 is the leader node $116_L$; if installation tasks have not been started, the compute node 116 attempts to obtain the lock 215 on the shared device 210. If the compute node 116 obtains the lock 215 on the shared device 210, the compute node 116 is the leader node $116_L$ and performs all major installation tasks associated with the shared resources 230. After completing all major installation tasks, attributes of the leader node are stored in the messaging framework 220, and the lock 215 on the shared device 210 is released (block 340).

By providing a method and apparatus for dynamic determination of a leader node during installation of a multiple node environment, it is possible to simultaneously boot multiple compute nodes in the multiple node environment, while ensuring that only one node of the multiple node environment will attempt to perform the major installation tasks associated with preparing the shared resources 230 for use within the multiple node environment. Providing a messaging framework 220 enables the boot process of each of the compute nodes 116 to be posted, thus accommodating nodes which take longer to boot as well as resolving problems that may be encountered when one or more of the compute nodes 116 is required to abruptly reboot. Since the process of dynamically determining a leader node described herein is able to be implemented during the installation process of the multiple node environment, the process of dynamically determining a leader node is able to be used in connection with the boot operation associated with installation of the multiple node environment, to thereby manage the process of initiating the shared resources 230 that are to be used by the compute nodes 116 once the boot process of each compute node has been completed.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and, or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of dynamic determination of a leader node during installation of a multiple node environment, the multiple node environment containing multiple compute nodes and a plurality of shared resources accessible to each of the multiple compute nodes, the method comprising:
    running a local boot script by each compute node of the multiple node environment to locally configure the compute node to operate in the multiple node environment;
    determining by a first of the compute nodes, from a messaging framework, whether installation of any of the plurality of shared resources has been initiated;
    in response to a determination by the first of the compute nodes that installation of none of the plurality of shared resources has been initiated, attempting to obtain a lock on a shared device by the first of the compute nodes;
    in response to obtaining the lock on the shared device by the first of the compute nodes, determining that the first of the compute nodes is the leader node during installation of the multiple node environment;
    running a global boot script by the leader node to initiate installation of the plurality of shared resources;
    posting updates associated with installation of the plurality of shared resources by the leader node to the messaging framework;
    determining by each of the plurality of compute nodes other than the first node, from the messaging framework, whether installation of any of the plurality of shared resources has been initiated; and
    in response to a determination by each of the plurality of compute nodes other than the first node that installation of at least one of the plurality of shared resources has been initiated, determining that each of the plurality of compute nodes other than the first node is a follower node during installation of the multiple node environment.

2. The method of claim 1, wherein the local boot script of each of the plurality of compute nodes other than the first node contains instructions to cause the respective compute node to poll the messaging framework to determine an installation status of at least some of the plurality of shared resources.

3. The method of claim 1, wherein the global boot script is locally stored on each compute node and executed only by the leader node.

4. The method of claim 1, wherein the global boot script is implemented as a part of the local boot script of each node and executed only by the leader node.

5. The method of claim 1, wherein the global boot script is centrally stored on an accessible resource in the multiple node environment and accessed by the leader node from the accessible resource.

6. The method of claim 1, wherein the messaging framework is accessible by all compute nodes of the multiple node environment.

7. The method of claim 6, wherein the messaging framework is implemented using a network-based messaging protocol.

8. The method of claim 7, wherein the messaging protocol is Service Location Protocol (SLP) configured to enable each of the compute nodes to post messages to all other compute nodes.

9. The method of claim 6, wherein the messaging framework is implemented using a shared database that enables each of the compute nodes to provide updates to the database that are then able to be retrieved by each of the other compute nodes.

10. The method of claim 1, wherein the shared device is accessible to all compute nodes in the multiple node environment and is not otherwise used in the local boot processes of any of the compute nodes.

11. A system for dynamic determination of a leader node during installation of a multiple node environment, comprising:
    multiple compute nodes and a plurality of shared resources accessible to each of the multiple compute nodes, each of the compute nodes containing one or more processors and one or more storage devices storing a local boot script that is operable, when executed by the one or more processors, to cause the one or more processors of the respective compute node to perform operations comprising:
    determining by a respective compute node, from a messaging framework, whether installation of any of the plurality of shared resources has been initiated;
    in response to a determination by the respective compute node from the messaging framework that installation of any of the plurality of resources has been initiated, determining by the respective compute node that the compute node is a follower node and not the leader node;
    in response to a determination by the respective compute node that installation of none of the plurality of shared resources has been initiated, attempting to obtain a lock on a shared device by the respective compute node;
    in response to a failure to obtain the lock on the shared device by the respective compute node, determining by the respective compute node that the compute node is a follower node and not the leader node;

in response to obtaining the lock on the shared device by the respective compute node, determining that the respective compute node is the leader node during installation of the multiple node environment;

running the local boot script by each compute node to implement a local boot process on each respective compute node during installation of the multiple node environment;

running a global boot script by the leader node to initiate installation of the plurality of shared resources during installation of the multiple node environment; and posting updates associated with installation of the plurality of shared resources by the leader node to the messaging framework.

12. The system of claim 11, wherein the local boot script is operable, when executed by the one or more processors of each of the compute nodes, to cause the compute nodes to poll the messaging framework to determine an installation status of at least some of the plurality of shared resources.

13. The system of claim 11, wherein the global boot script is locally stored on each compute node and executed only by the leader node.

14. The system of claim 11, wherein the global boot script is implemented as a part of the local boot script of each node and executed only by the leader node.

15. The system of claim 11, wherein the global boot script is centrally stored on an accessible resource in the multiple node environment and accessed by the leader node from the accessible resource.

16. The system of claim 11, wherein the messaging framework is accessible by all compute nodes of the multiple node environment.

17. The system of claim 16, wherein the messaging framework is implemented using a network-based messaging protocol.

18. The system of claim 17, wherein the messaging protocol is Service Location Protocol (SLP) configured to enable each of the compute nodes to post messages to all other compute nodes.

19. The system of claim 16, wherein the messaging framework is implemented using a shared database that enables each of the compute nodes to provide updates to the database that are then able to be retrieved by each of the other compute nodes.

20. The system of claim 11, wherein the shared device is accessible to all compute nodes in the multiple node environment and is not otherwise used in the local boot processes of any of the compute nodes.

\* \* \* \* \*